US008738951B2

(12) United States Patent
Wong et al.

(10) Patent No.: US 8,738,951 B2
(45) Date of Patent: *May 27, 2014

(54) MOBILE SYSTEMS WITH SEAMLESS TRANSITION BY ACTIVATING SECOND SUBSYSTEM TO CONTINUE OPERATION OF APPLICATION EXECUTED BY FIRST SUBSYSTEM AS IT ENTERS SLEEP MODE

(75) Inventors: Hong W. Wong, Portland, OR (US); Wah Yiu Kwong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 703 days.

This patent is subject to a terminal disclaimer.

(21) Appl. No.: 12/380,736

(22) Filed: Mar. 3, 2009

(65) Prior Publication Data
US 2009/0172450 A1 Jul. 2, 2009

Related U.S. Application Data

(63) Continuation of application No. 11/127,909, filed on May 11, 2005, now Pat. No. 7,500,128.

(51) Int. Cl.
*G06F 1/32* (2006.01)
(52) U.S. Cl.
USPC .......................................... 713/324; 713/320
(58) Field of Classification Search
USPC .................................................. 713/324, 320
See application file for complete search history.

(56) References Cited

U.S. PATENT DOCUMENTS

| 5,768,164 A | 6/1998 | Hollon, Jr. |
| 6,137,840 A | 10/2000 | Tiedemann et al. |
| 6,377,530 B1 | 4/2002 | Burrows |
| 6,819,961 B2 | 11/2004 | Jacobs et al. |
| 6,934,812 B1 | 8/2005 | Robbin et al. |
| 6,938,174 B2 | 8/2005 | LeKuch et al. |
| 7,080,271 B2 | 7/2006 | Kardach et al. |
| 7,240,228 B2 | 7/2007 | Bear et al. |
| 7,254,730 B2 | 8/2007 | Kardach et al. |
| 7,263,622 B2 | 8/2007 | Ohba |
| 7,426,647 B2 | 9/2008 | Fleck et al. |

(Continued)

FOREIGN PATENT DOCUMENTS

| TW | 559417 U | 10/2003 |
| WO | 2006/124253 A1 | 11/2006 |

OTHER PUBLICATIONS

International Search Report/ Written Opinion for PCT Patent Application No. PCT/US2006/016560, mailed Sep. 6, 2006, 12 pages.

(Continued)

*Primary Examiner* — Chun Cao
(74) *Attorney, Agent, or Firm* — Jordan IP Law, LLC

(57) ABSTRACT

A computer system includes two or more subsystems. In one example, a first subsystem is executing a multimedia application using data stored in a first storage device. A copy of the data is also stored in a second storage device associated with a second subsystem. The second subsystem may be a dedicated multimedia player controller. When the first subsystem is to enter a sleep state, the second subsystem may continue to process the multimedia data stored in the second storage device. The second subsystem may also use the same audio port that the first subsystem was using before it enters the sleep state. Appropriate transition point may be determined by the second subsystem to ease audio disruption.

21 Claims, 9 Drawing Sheets

(56) References Cited

U.S. PATENT DOCUMENTS

| | | | |
|---|---|---|---|
| 7,500,128 B2 * | 3/2009 | Wong et al. ................... | 713/324 |
| 2002/0087225 A1 | 7/2002 | Howard | |
| 2005/0064911 A1 | 3/2005 | Chen et al. | |
| 2005/0066207 A1 | 3/2005 | Fleck et al. | |
| 2005/0066209 A1 | 3/2005 | Kee et al. | |

OTHER PUBLICATIONS

Individual Specifications, ChemBook 2076 Series Specifications, 4 pages. http://www.chemusa.com/chembook_2070.htr.

International Preliminary Report on Patentability for PCT Patent Application No. PCT/US2006/016560, Mailed Nov. 22, 2007, pp. 9.

Taiwan IPO Search Report, completed Jul. 7, 2009. Taiwan patent application No. 95115909.

German Office Action, application No. 11 2006 001 168.5-53. Mailing date Nov. 11, 2009. Five pages including two pages of English translation.

Chinese Office Action, application No. 2006800157567. Mailing date May 8, 2009. Nine pages including three pages of English translation.

Chinese Office Action, application No. 2006800157567. Mailing date Aug. 19, 2011. Four pages including two pages of English translation.

* cited by examiner

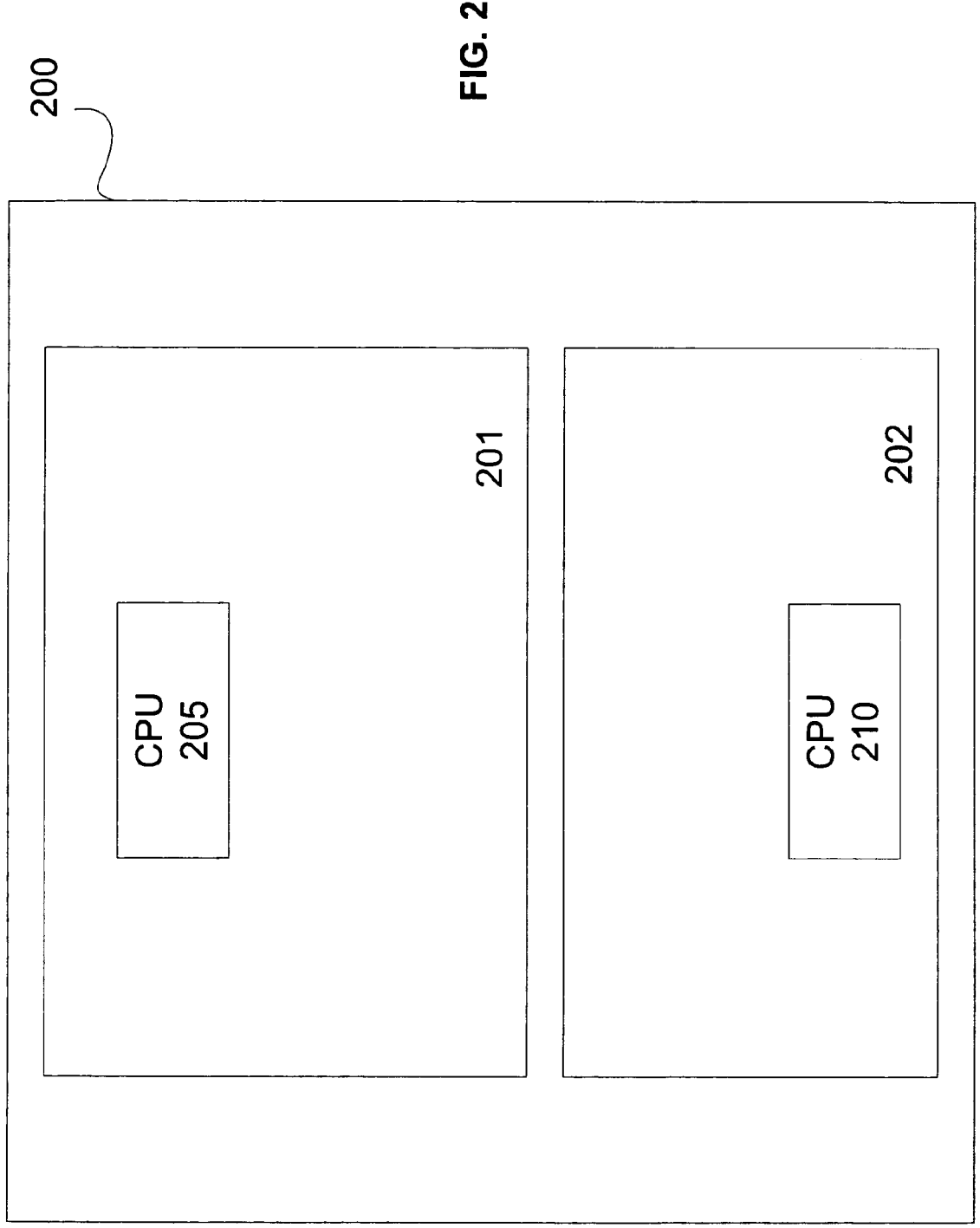

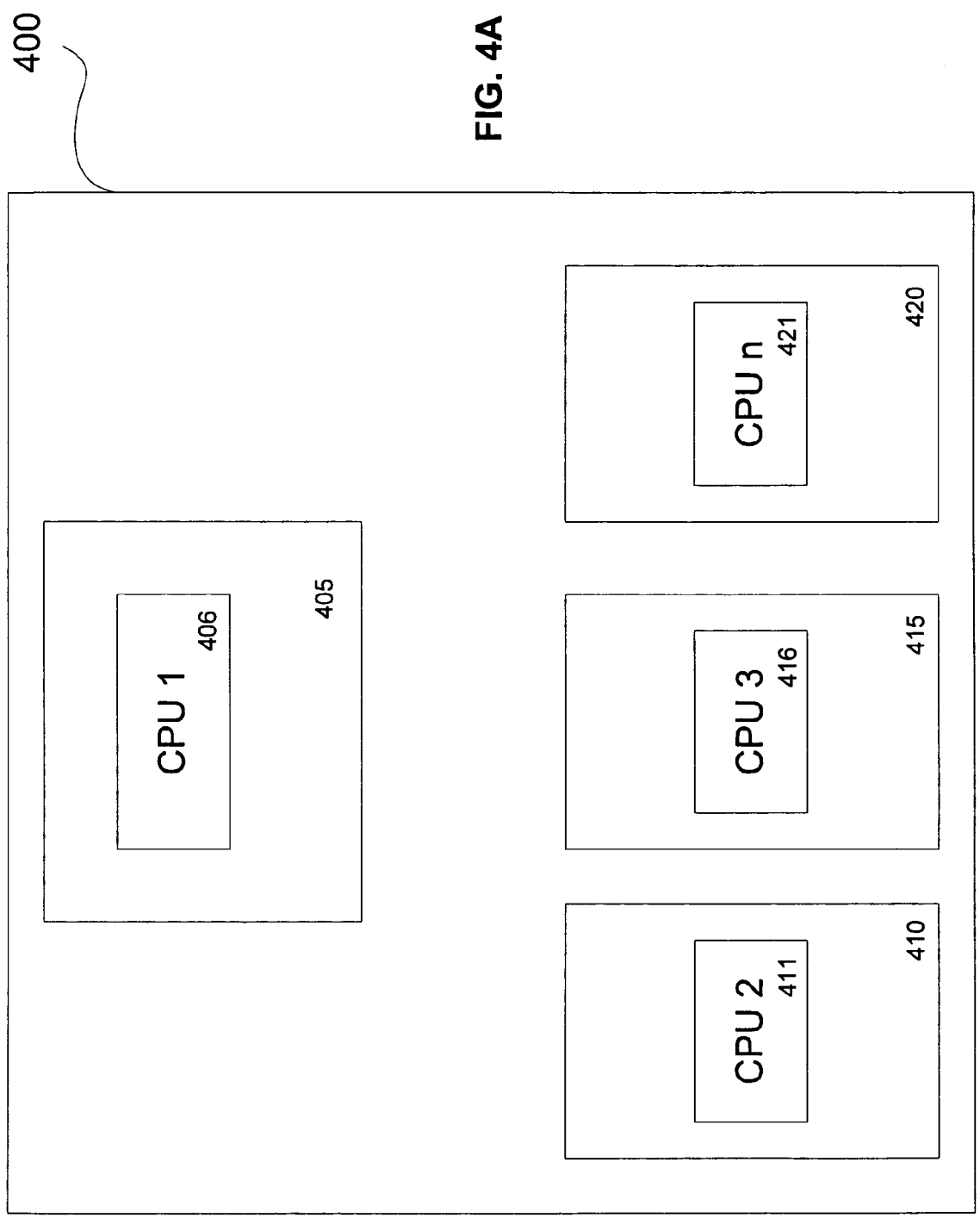

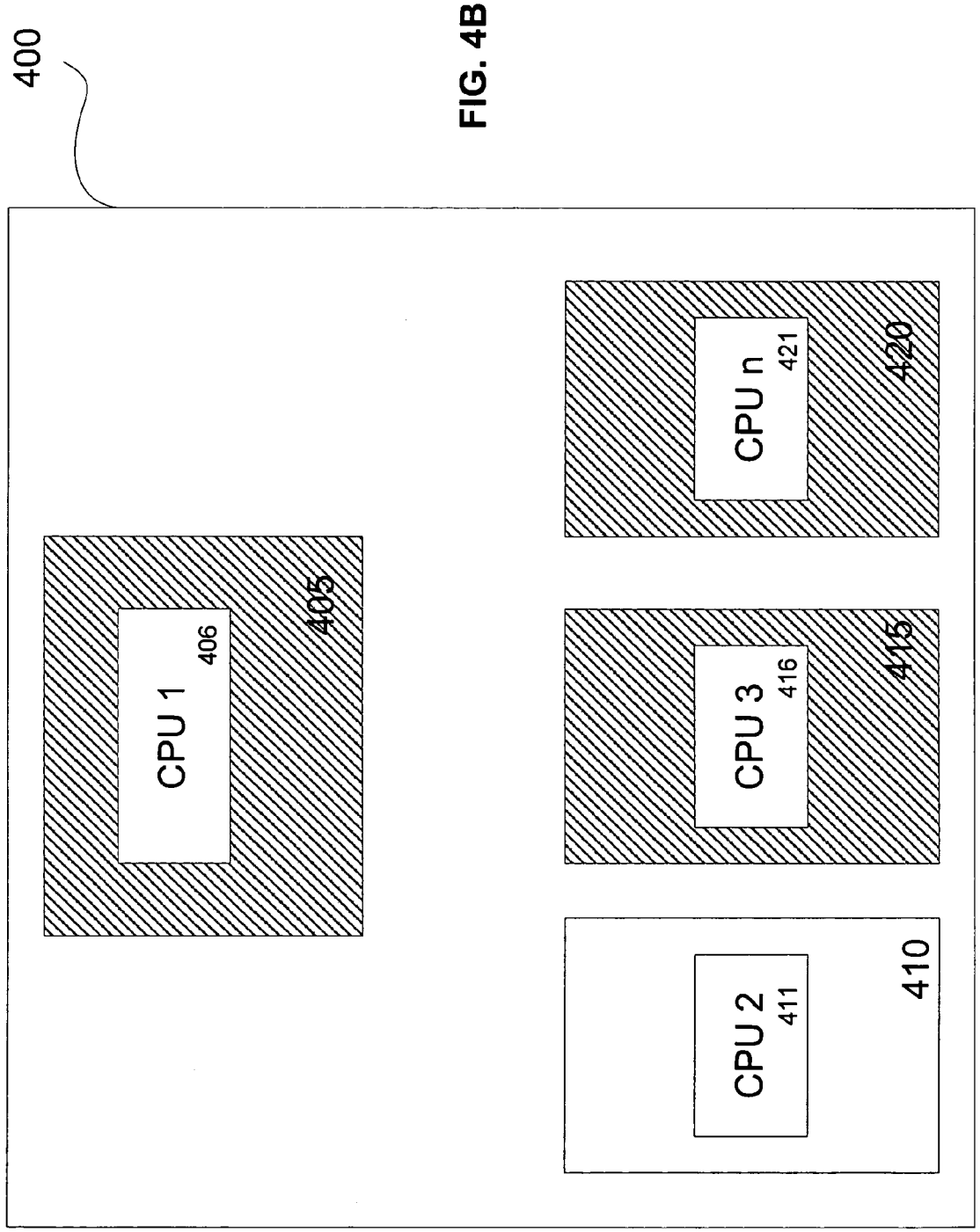

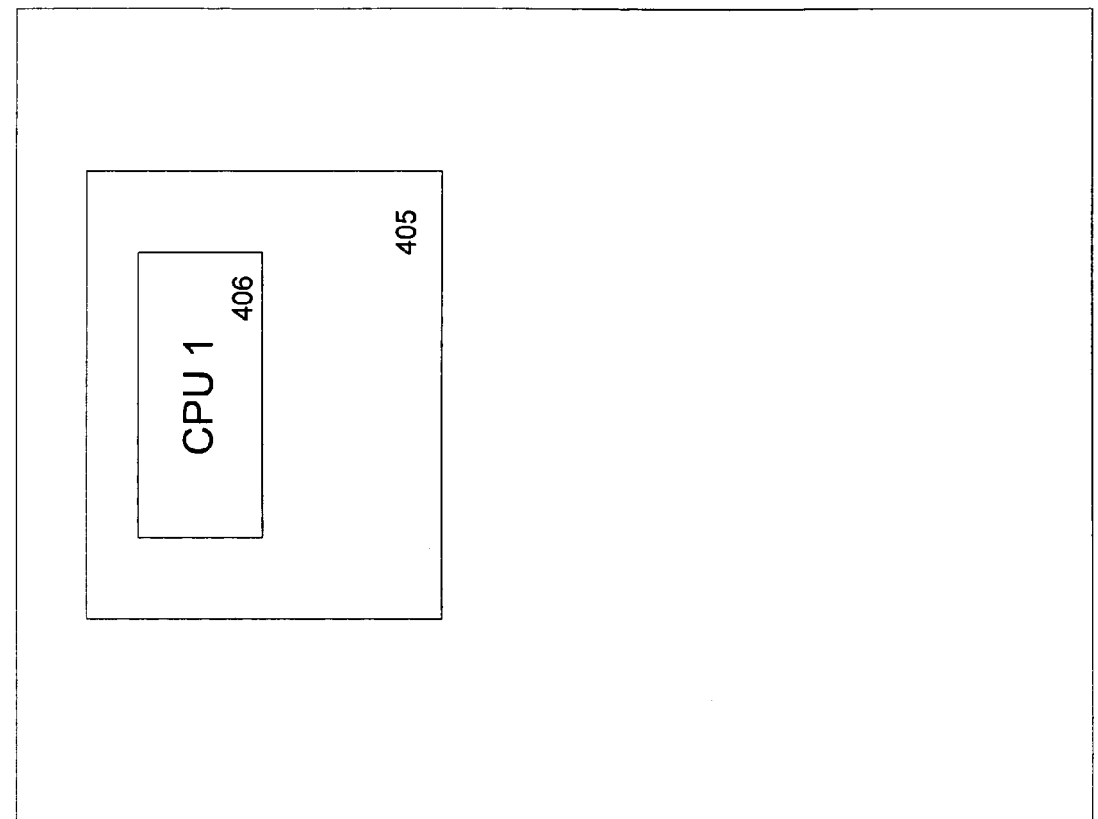
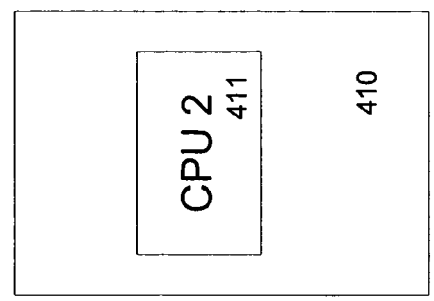
FIG. 6

MOBILE SYSTEMS WITH SEAMLESS TRANSITION BY ACTIVATING SECOND SUBSYSTEM TO CONTINUE OPERATION OF APPLICATION EXECUTED BY FIRST SUBSYSTEM AS IT ENTERS SLEEP MODE

CROSS REFERENCE TO RELATED APPLICATION

This application is a continuation of and claims priority to U.S. patent application Ser. No. 11/127,909 titled, "MOBILE SYSTEMS WITH SEAMLESS TRANSITION BY ACTIVATING SECOND SUBSYSTEM TO CONTINUE OPERATION OF APPLICATION EXECUTED BY FIRST SUBSYSTEM AS IT ENTERS INTO SLEEP MODE" filed May 11, 2005 now U.S. Pat. No. 7,500,128; this application is entirely incorporated by reference.

FIELD OF INVENTION

The present invention relates generally to the field of power management. More specifically, the present invention relates to providing seamless transition of among different operating environments.

BACKGROUND

Portable computer systems are becoming increasingly popular. Power to a portable computer system is normally provided by a direct current (DC) power source such as, for example, a battery. One concern with the use of the battery is the battery life. Depending on how the computer system is used, the frequency of how often the battery may need to be recharged may vary. As more advanced applications are developed, the balance between the user experience and the battery life becomes more evident. A computer system operating in a high power consumption mode may provide an excellent user experience, but it may drain the battery faster than when the computer system is operating in a low power consumption mode. When the battery is drained, an application may end abruptly and thus can negatively affect the user experience. Efforts are being developed to improve the user experience while reducing the effect of the battery life.

BRIEF DESCRIPTION OF THE DRAWINGS

The invention may be best understood by referring to the following description and accompanying drawings that are used to illustrate embodiments of the invention. In the drawings:

FIG. 2 illustrates an example of a computer system having two subsystems, in accordance with one embodiment.

FIG. 4A illustrates an example of a computer system having multiple subsystems, in accordance with one embodiment.

FIG. 4B illustrates an example of a computer system having multiple subsystems in low power states, in accordance with one embodiment.

FIG. 6 illustrates an example of a process used to transition between two operating environments, in accordance with one embodiment.

DESCRIPTION

In some embodiments, a computer system may include two or more subsystems. The two or more subsystems may share a data bus and may process related data at different times. When a first subsystem goes into a low power state, a transition to a second subsystem may occur. The second subsystem may continue to process the data that was being processed by the first subsystem prior to the first subsystem going into the low power state. The processing of the data by the second subsystem may include identifying a transition point in the data to reduce any disruption caused by the second subsystem continuing to process the data.

In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Computer System

Figure 1A:
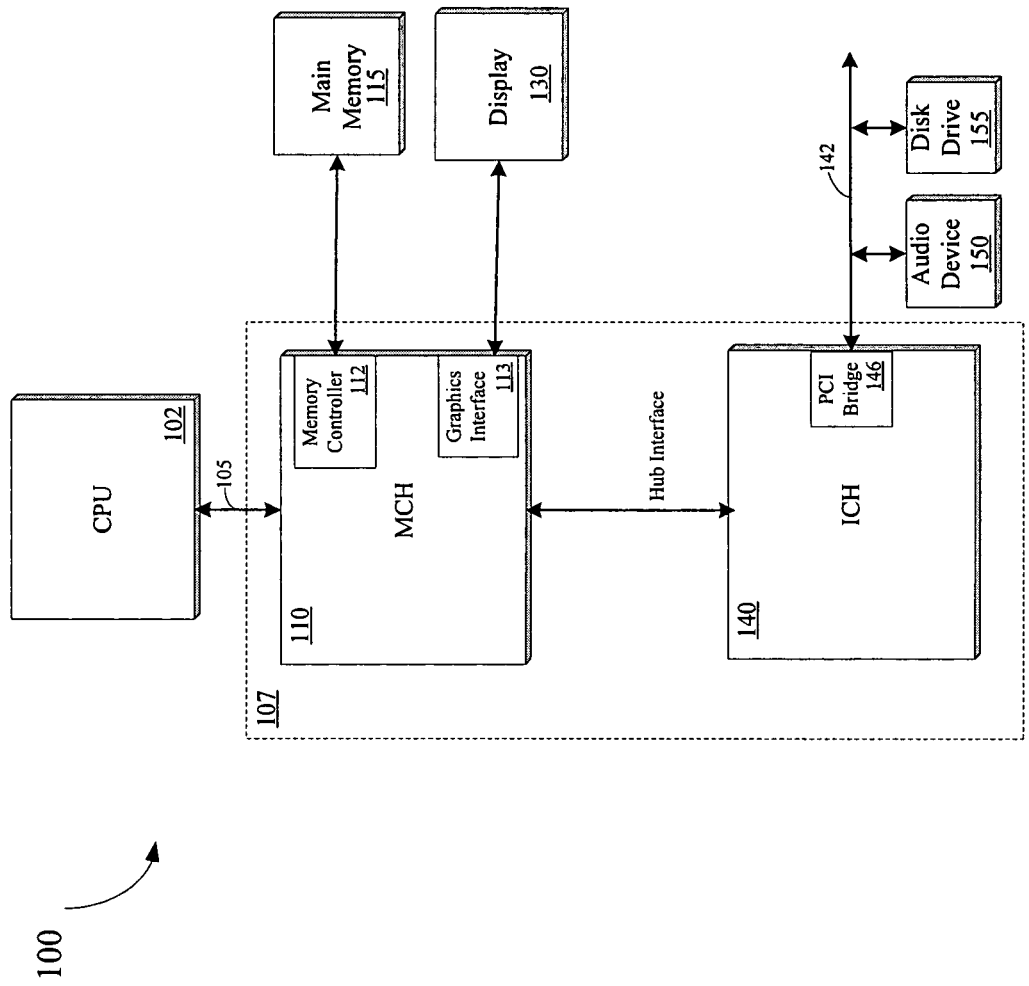
FIG. 1A illustrates an example of a computer system, in accordance with one embodiment.

FIG. 1A is a block diagram illustrating an example of a computer system that may be used, in accordance with an embodiment of the invention. Computer system 100 may include a central processing unit (CPU) 102 and may receive its power from an electrical outlet or a battery (not shown). The CPU 102 and chipset 107 may be coupled to bus 105.

The chipset 107 may include a memory control hub (MCH) 110. The MCH 110 may include a memory controller 112 that is coupled to memory 115. The memory 115 may store data and sequences of instructions that are executed by the CPU 102 or any other processing devices included in the computer system 100. The data may include time dependent or isochronous data that needs to be processed or delivered within certain time constraints. For example, multimedia streams require an isochronous transport mechanism to ensure that data is delivered as fast as it is displayed and to ensure that the audio is synchronized with the video. The data may include asynchronous data which may be delivered in random intervals, and synchronous data which may be delivered only at specific intervals.

The MCH 110 may include a graphics interface 113. Display 130 may be coupled to the graphics interface 113. The chipset 107 may also include an input/output control hub (ICH) 140. The ICH 140 is coupled with the MCH 110 via a hub interface. The ICH 140 provides an interface to input/output (I/O) devices within the computer system 100. The ICH 140 may include PCI bridge 146 that provides an interface to PCI bus 142. The PCI bridge 146 may provide a data path between the CPU 102 and peripheral devices. An audio device 150 and a disk drive 155 may be connected to the PCI bus 142. The disk drive 155 may include a storage media to store data and sequences of instructions that are executed by the CPU 102 or any other processing devices included in the computer system 100. Although not shown, other devices (e.g., keyboard, mouse, etc.) may also be connected to the PCI bus 142 or other system bus.

Figure 1B:
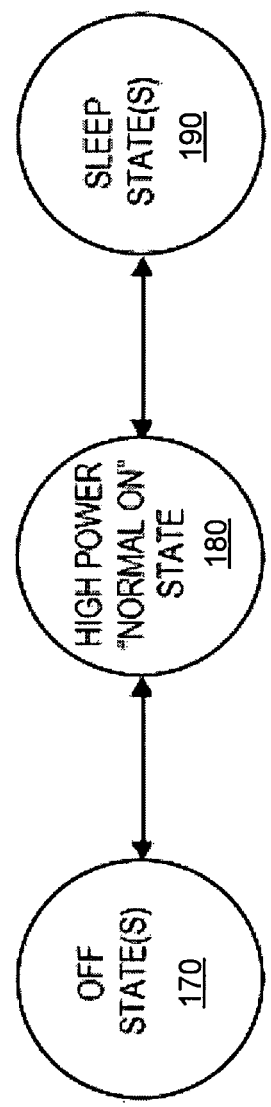
FIG. 1B illustrates an example of different states of a processor in a computer system, in accordance with one embodiment.

FIG. 1B illustrates an example of a state diagram for a computer system. Examples of the operating states illustrated in FIG. 1B may be found in the Advanced Configuration and Power Interface (ACPI) Specification, Revision 2.0a dated Mar. 31, 2002 (and published by Compaq Computer Corporation, Intel Corporation, Microsoft Corporation, Phoenix Technologies Ltd., and Toshiba Corporation). Referring to FIG. 1B, a first state 180 (referred to as "normal on" state) is the normal operating state of the computer system 100. Within the ACPI specification, the "normal on" state 180 is referred to as the "G0" state. A second state 170 refers to any one or more states where the computer system 100 is recognized as being "off". The ACPI specification recognizes two such off states: a hardware based off state (e.g., where power has been removed from the entire system) and a software based off state (where power is provided to the system but the BIOS and operating system (OS) have to be reloaded from scratch without reference to the stored context of a previously operating environment). The ACPI specification refers to the hardware based off state as the "G3" state and the software based off state as the "G2" state.

A third state 190 refers to any of one or more states where the computer system 100 is recognized as "sleep". For sleep states, the operating environment (also referred to as a context) of the computer system 100 in the "normal on" state 180 is saved prior to the CPU 102 of the computer system 100 being entered into a low power consumption state. The sleep state(s) 190 are aimed at saving power consumed by the CPU 102 over a lull period in the continuous use of the computer system 100. The saved operating environment is restored as part of the transition back to the "normal on" state 180 from the sleep state(s) 190. The ACPI specification recognizes a collection of different sleep states (notably the "S1", "S2", "S3" and "S4" states) each having its own respective balance between power savings and delay or latency when returning to the "normal on" state 180 (here, the S1, S2 and S3 states are recognized as being various flavors of "standby" and the S4 state is a "hibernate" state). Although power consumed by the CPU 102 is reduced when it is in one of the sleep state 190, the CPU 102 may not be able to perform work. Although the ACPI specification is recognized as describing a large number of existing computer systems, it should be recognized that large numbers of computer systems may not conform to the ACPI specification but still conform to the operating state configuration observed in FIG. 1B. As such, the description of FIG. 1A may correspond to a more generic computer system that may or may not conform to the ACPI specification.

Multiple Subsystems

FIG. 2 illustrates an example of a computer system having two subsystems, in accordance with one embodiment. In this example, computer system 200 may include two subsystems 201 and 202. The subsystem 201 may include CPU 205, and subsystem 202 may include CPU 210. Although not shown, each of the subsystems 201 and 202 may also include other devices such as, for example, memory, I/O devices, etc. The subsystems 201 and 202 may both be active at the same time, or one subsystem may be active while the other is not. For example, both the subsystems 201 and 202 may be in the "normal on" state 180. As another example, the subsystem 201 may be in a sleep state 190 while the subsystem 202 may be in the "normal on" state 180. Other operating state combinations may also be possible.

For one embodiment, the subsystems 201 and 202 may share some common bus. The common bus may include a data bus, an instruction bus, a signal line, etc. The subsystems 201 and 202 may also have access to common devices. For example, the subsystems 202 may be able to access a storage device or an input/output device associated with the subsystem 210.

For one embodiment, the subsystems 201 and 202 may be tightly coupled. For example, the computer system 200 may be a laptop computer system having a lid unit and a base unit, and the CPU 205 in the subsystem 201 may be a main processor and the CPU 210 in the subsystem 202 may be a non-main processor. The CPU 205 may be coupled to the display 130 serving as a primary display. The CPU 210 may be coupled to a smaller secondary display (not shown). The secondary display may be located on the exterior side of the lid unit and may be used to display information similar to, for example, Personal Information Management (PIM) information or information typically displayed by a Personal Digital Assistant (PDA).

For another embodiment, the subsystems 201 and 202 may be loosely coupled. That is, in addition to operating together with the subsystem 201 when coupled, the subsystem 202 may be separated from the subsystem 201 and may operate independently of the subsystem 201 as two separate systems. Of course, the subsystem 202 may later be re-coupled to the subsystem 201.

Depending on the application(s) being executed and/or the type of data being delivered by either or both of the subsystems 201 and 202, there may be synchronization issue. For example, while processing a data stream, the subsystem 201 may enter the sleep state 190. The subsystem 202 may remain in the "normal on" state 180 and may continue to process the same data stream after certain transition latency. The effect of the transition latency may be significant (e.g., audio disruption, video distortion, etc.) and may affect user experience. Although the current example refers to two subsystems, the computer system 200 may include more than two subsystems.

Figure 3A:
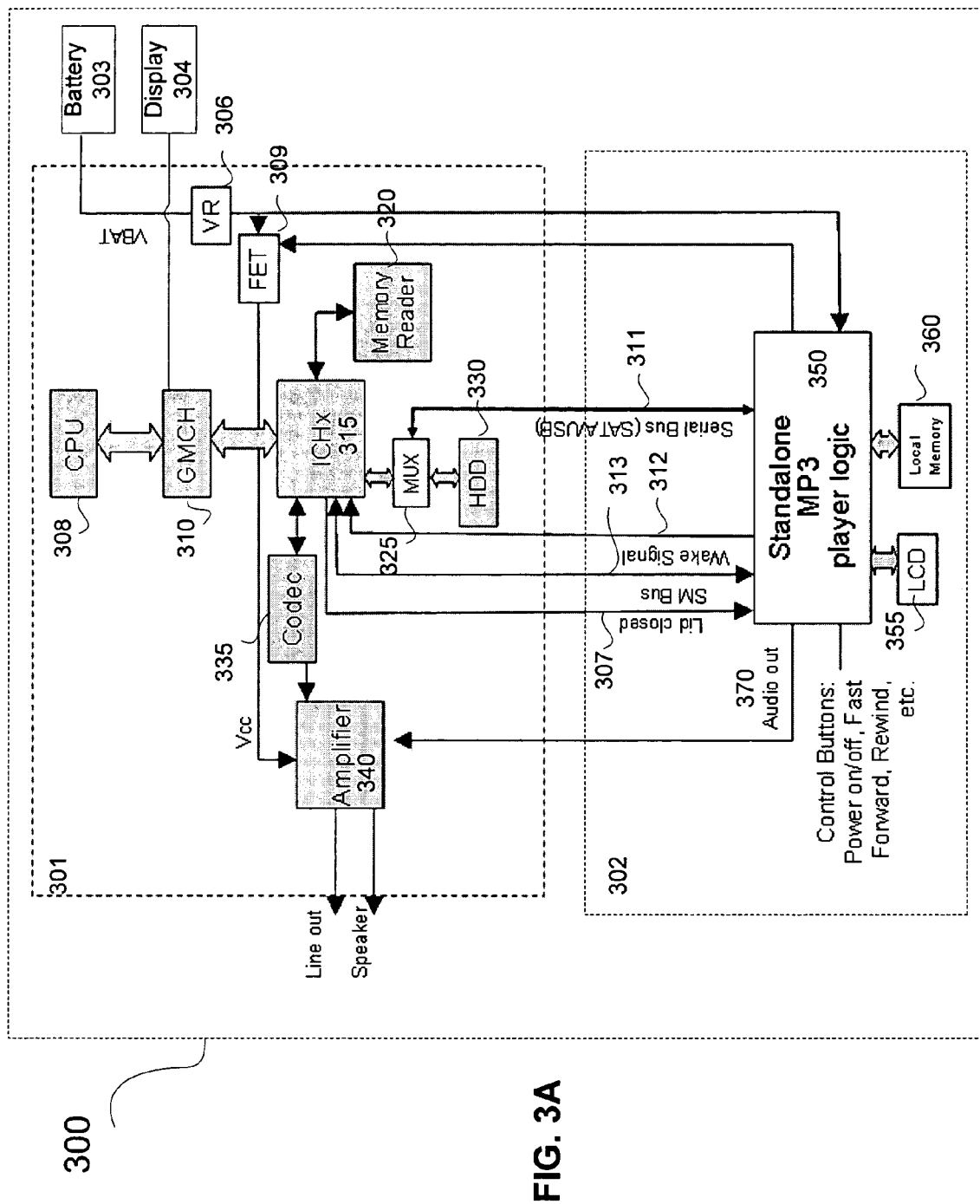
FIG. 3A illustrates an example of a hardware architecture for a computer system having an MP3 subsystem, in accordance with one embodiment.

FIG. 3A illustrates an example of hardware architecture for a computer system having multiple subsystems, in accordance with one embodiment. In this example, computer system 300 may be a laptop computer system having a lid unit and a base unit (not shown) in a clamshell form factor. There are two subsystems 301 and 302, and they may operate independently of one another or they may work together (e.g., in serial or in parallel) processing the same data stream.

A battery 303 may be used to provide power to the subsystem 301. The subsystem 301 includes CPU 308, graphics and memory controller hub (GMCH) 310 and I/O controller hub (ICH) 315. The CPU 308 may be viewed as a main processor. The GMCH 310 is coupled to display (or primary display) 304. The ICH 315 is coupled to a coder/decoder (CODEC) 335 which is coupled to audio output logic. The audio out logic may include an amplifier 340 and output signals for a line out and a speaker.

Data may be stored in a storage device or hard disk drive (HDD) 330. Data may also be provided externally using various memory devices (e.g., compact flash card, smart media card, multimedia card, secure digital card, memory stick card, microdrive, etc.) via a memory reader 320 coupled to the ICH 315. In this example, the data may include audio and/or video data. For example, the audio data may be encoded in MP3 format and stored in the HDD 330. The CPU 308 may execute an MP3 player application (e.g., Musicmatch Jukebox from Musicmatch of San Diego, Calif.) which retrieves the MP3 encoded data from the HDD 330 and deliver it to the amplifier 340 via the CODEC 335. Furthermore, the CPU 308 may execute a DVD player application (e.g., directDVD from OrionStudios of Los Angeles, Calif.)

that delivers audio data and video data from the HDD 330 to the amplifier 340 and to the display 304, respectively.

The subsystem 302 may be a multimedia player subsystem. Power to the subsystem 302 may also be provided by the battery 303 via voltage regulator (VR) 306. Although not shown, the subsystem 302 may also include its own power source. The subsystem 302 may include its own display (or secondary display) 355 and local memory (e.g., flash) 360. Different techniques (e.g., switches, software push buttons, etc.) may be used to control various operations of the subsystem 302. These operations may include, for example, power on/off, fast forward, rewind, pause, etc.

In this example, the subsystem 302 may include an MP3 player controller 350 (e.g., MP3 player controller from Integrated Circuit Solution Inc. (ICSI) of Taiwan) which may be viewed as a non-main processor. The subsystem 302 may also include its own MP3 decoder (not shown) and may be able to access data from external memory devices (e.g., smart media, etc.). In this example, it is envisioned that the power consumption associated with the subsystem 302 is low compare to that of the subsystem 301.

For one embodiment, the subsystem 302 may share some devices associated with the subsystem 301. These shared devices may include input and output devices. For example, the subsystem 302 may include a serial data bus 311 connected to a multiplexer (MUX) 325 to enable the subsystem 302 to access the HDD 330 and possibly other I/O devices connected to the ICH 315. For one embodiment, the subsystem 302 may include an audio out signal 370 that may be connected to the audio output logic and amplifier 340 of the subsystem 301. For another embodiment, the local memory 360 may include a subset of the data stored in the HDD 330 or in the external memory coupled the memory reader 320. For example, the local memory 360 may contain at least a copy of an MP3 play list that is being processed by the subsystem 301. For one embodiment, the data in the local memory 360 may be updated periodically based on the data being processed by the subsystem 301. Other communications between the subsystem 301 and the subsystem 302 may be carried out using the system management bus (SMB) 313.

When the lid unit of the computer system 300 is closed onto the base unit, the subsystem 301 may transition from a "normal on" state 180 to the sleep state 190. The subsystem 302 may remain in the "normal on" state 180. For one embodiment, a lid closed signal 307 may be generated and sent from the subsystem 301 to the subsystem 302. The subsystem 301 may stop processing the data, but the subsystem 302 may take over and continue to process the same data. The ICH 315 may include edge transition logic to detect the state transition of the lid closed signal 307. For example, when the lid unit is opened, the state of the lid closed signal 307 may be "0". When the lid unit is closed, the state of the lid closed signal 307 may be "1". For one embodiment, the edge transition logic may remain powered on even when the subsystem 301 is in a sleep state.

Depending on the capacity of the local memory 360, the subsystem 302 may or may not need to communicate with the subsystem 301. For one embodiment, when additional data is needed, the subsystem 302 may wake up the subsystem 301 using the wake signal 312. For example, when the subsystem 302 almost completes processing an MP3 play list, the subsystem 302 may use the wake signal 312 to wake up the subsystem 301 to download additional play lists from the HDD 330. The download process data may be performed using the serial bus 311, and the additional play lists may be stored in the local memory 360. For one embodiment, when the download process is completed, the subsystem 301 may return to the sleep state.

When the lid unit is opened, the subsystem 302 may transition the processing of the data to the subsystem 301. It may be noted that because the audio data from the subsystem 302 is multiplexed to the audio output logic of the subsystem 301, the audio data may continue to be delivered by the subsystem 301 (e.g., via the HDD 330) to the audio output logic with little disruption. Similarly, the video data may be directed from the secondary display 355 to the primary display 304. Alternatively, the video data may be multiplexed to both the primary display 304 and the secondary display 355.

Figure 3B:
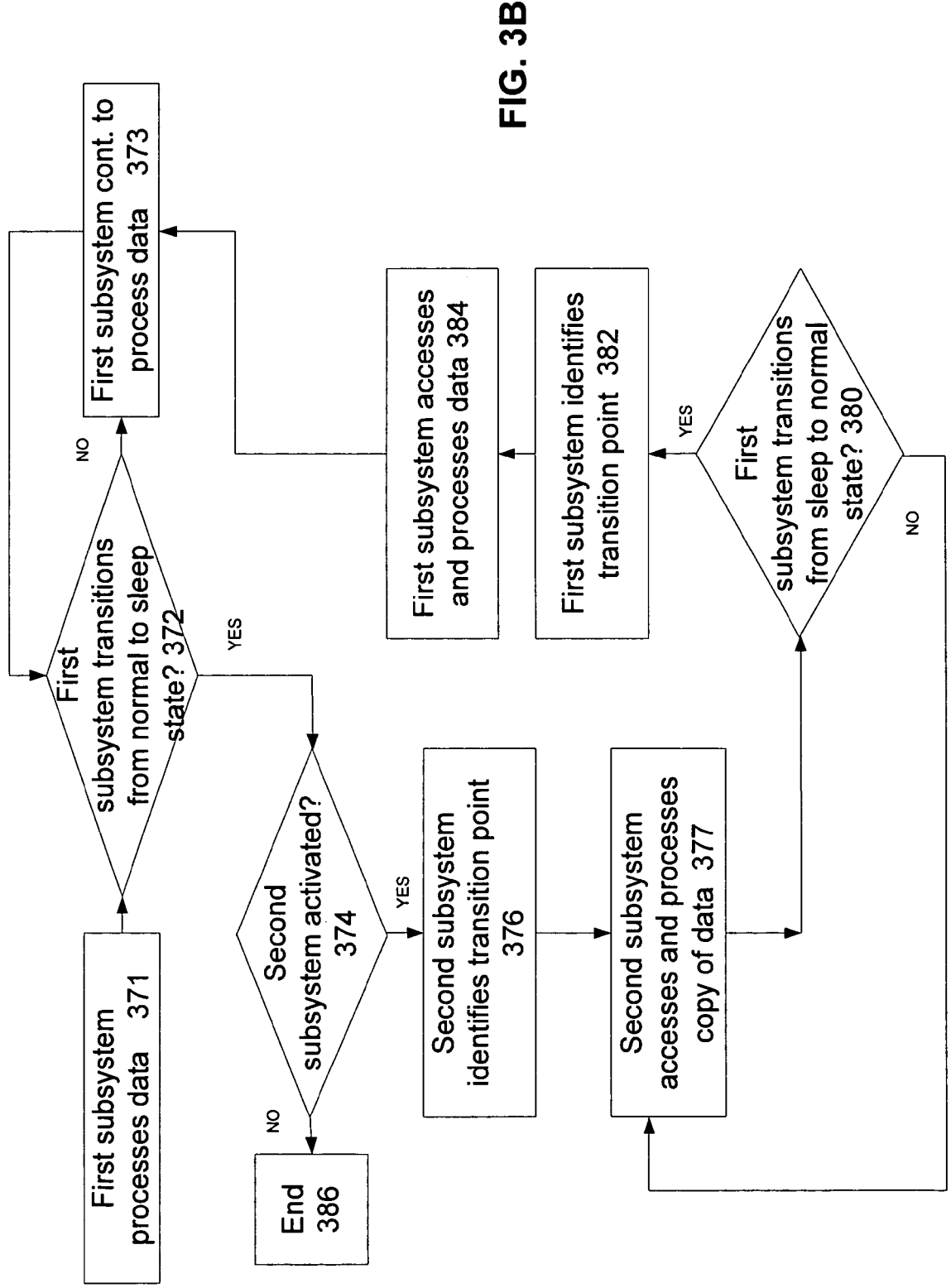
FIG. 3B illustrates an example of a software architecture for a computer system having an MP3 subsystem, in accordance with one embodiment.

FIG. 3B illustrates an example of process that may be used to transition between subsystems, in accordance with one embodiment. The process may be used in a computer system having two subsystems, with one subsystem including an MP3 player controller. The process may start at block 371 where a first subsystem is processing data. At block 372, a test is performed to determine if the first subsystem is exiting the "normal on" state and entering the sleep state. If the first subsystem is not exiting the "normal on" state, the process continues at block 373 where the first system continues to process the data.

If the first subsystem is exiting the "normal on" state, the process continues to block 374. At block 374, a test is performed to determine if the second subsystem is activated. It may be possible that when the first subsystem is in the "normal on" state, the second subsystem is also in the "normal on" state, and when the first system exits the "normal on" state, the second subsystem remains in the "normal on" state. Alternatively, when the first subsystem exits the "normal on" state, the second subsystem may need to be activated to be or to remain in the "normal on" state; otherwise, it may also exit the "normal on" state.

From block 374, if the second subsystem is not in the "normal on" state, the process may end at block 386. Otherwise, the process may continue at block 376. For one embodiment, the second subsystem may identify an appropriate transition point in the data to take over the processing of the data from the first subsystem. For example, when the data is audio data, the transition point may be a within a silent duration. When the data is MP3 data, the transition point may be between songs so that the second subsystem may fad in. The second subsystem may also perform some audio effects to ease the transition process and to reduce audio disruption. When the data is video data, the transition point may be when there is a scene change. A transition point may be introduced by presenting some video effects in the process to reduce video disruption.

At block 377, the second subsystem processes the data in the local memory. As mentioned above, the data in the local memory may be a subset of the data that is stored in the first subsystem. The data in the local memory may be limited and the second subsystem may exhaust the data before the first subsystem exits the sleep state. For example, when the second subsystem is de-coupled from the first subsystem, the second subsystem may exhaust the data in its local memory before the second subsystem is re-coupled to the first subsystem. In this example, the first subsystem may automatically exit the sleep state when the second subsystem is re-coupled. Alternatively, the first subsystem may need to be awakened to exit the sleep state even when the second subsystem is re-coupled to it.

At block 380, a test is performed to determine if the first system exits the sleep state and enters the "normal on" state. If it does not exit the sleep state, the process continues at block 377. If it exits the sleep state, the process continues at block 382, where the first subsystem identifies a transition point to take over the processing of the data from the second subsystem. At block 382, the first subsystem accesses and processes the data from its own storage device. The process then continues at block 384, then 373.

Although some of the above examples refer to computer systems having two subsystems, it is possible that a computer system may have more than two subsystems. For example, illustrated in FIG. 4A, computer system 400 includes four subsystems 405-420. One or more of the subsystems 411, 416 and 421 may be detached from the computer system 400, and one or more of these subsystems may be remain in the "normal on" state when the subsystem 405 enters the sleep state. This is illustrated in the example in FIG. 4B where the subsystems 405, 415, 420 are in the sleep state while the subsystem 410 is in the "normal on" state.

Figure 5:
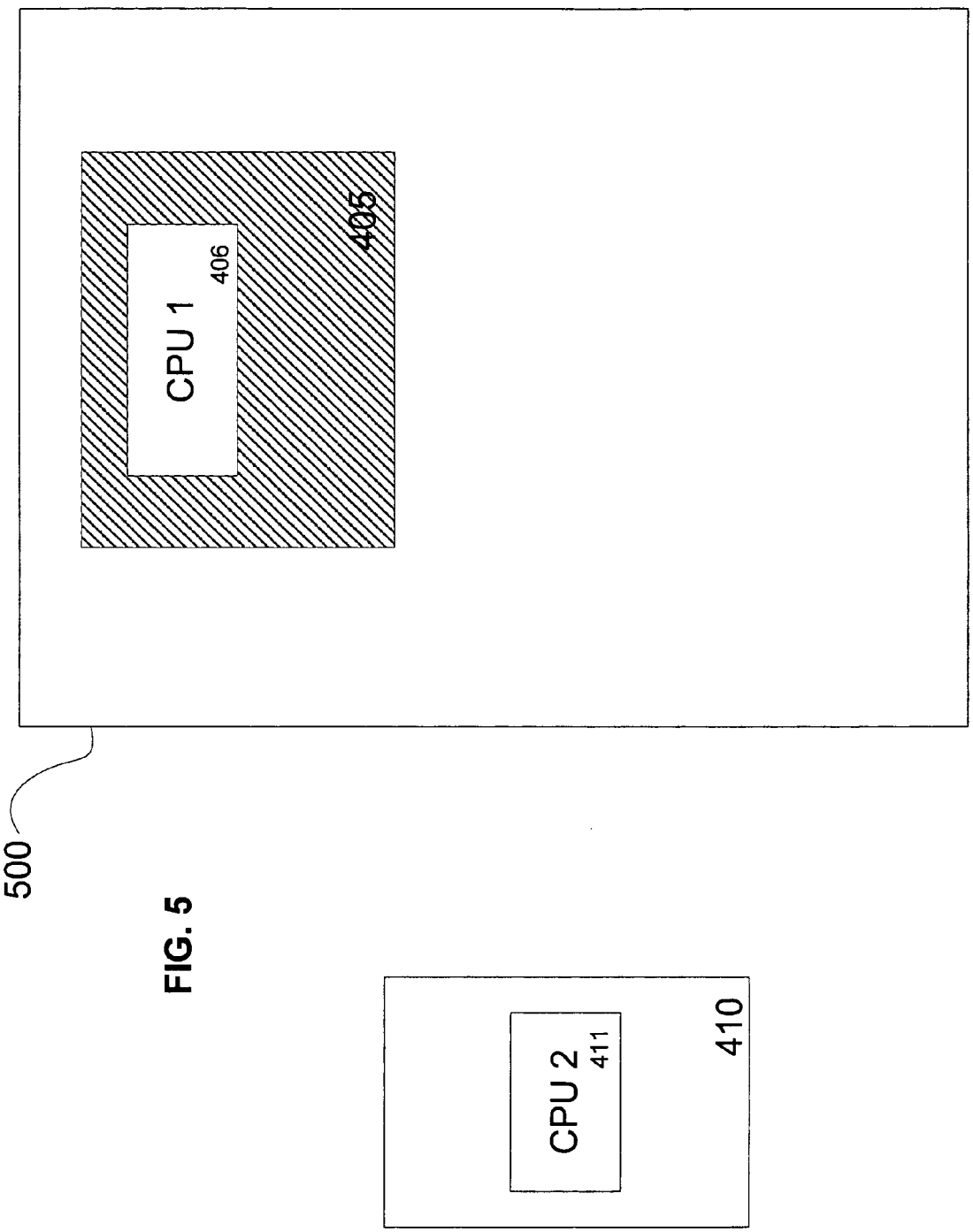
FIG. 5 illustrates an example of a computer system having a detachable subsystem, in accordance with one embodiment.

FIG. 5 illustrates an example of a computer system having a detachable subsystem, in accordance with one embodiment. Computer system 500 is similar to the computer system 400 illustrated in FIG. 4B. In this example, the subsystem 410 may be detached from the computer system 500 and may remain in the "normal on" state when the other subsystem(s) in the computer system 500 may be in the sleep state. It may be noted that the subsystem 410 may share some I/O devices with the subsystems 405 when the subsystem 410 is attached to the computer system 500. Although the subsystem 410 may have its own I/O devices, the sharing of I/O devices with the subsystem 405 may be possible using wireless communication (e.g., Bluetooth, etc.) when the subsystem 405 is detached from the computer system 500. In the current example, the subsystem 505 may operate with its own power supply and I/O devices including its storage device, display, speakers, etc.

As an example, the computer system 500 may be a multimedia computer system performing operations as provided by a media center. The computer system 500 may receive input (e.g., TV programs, movies, news, etc.) from various data sources via an Internet connection, a cable modem, a satellite connection, etc. The computer system 500 may be coupled to a program recording logic such as, for example, a TiVo system from TiVo Inc. of Alviso, Calif. The computer system 500 may be operating with the Windows XP operating system from Microsoft Corporation of Redmond, Wash. The computer system 500 may also execute media center software such as, for example, Media Center for Windows XP from Microsoft.

The subsystem 405 may be a TiVo system and may play a recorded video program stored on its storage device. The video program may be displayed on a display or on a television screen connected to a video output port associated with the subsystem 405.

The subsystem 410 may be capable of operating independently of the subsystem 405. For example, the subsystem 410 may be a small form factor entertainment subsystem that may be attached to or detached from the computer system 500 via a docking station (not shown).

A copy of the data stored in the subsystem 405 may be stored in the subsystem 410. For example, a video program may be downloaded to the storage device of the subsystem 405 from a video supplier or a network feed while the subsystem 410 is in the sleep state. The subsystem 405 may wake up the subsystem 410, and the video program may be copied and stored in the local memory or storage device of the subsystem 410. The subsystem 410 may then re-enter the sleep state.

It may be possible that the copying of the data or video program in the above example may be initiated by the subsystem 410. For example, when the subsystem 405 is in the sleep state, the subsystem 410 may need to wake up the subsystem 405. This may be performed via a wake up signal when the subsystem 410 is coupled to the subsystem 405, or it may be performed via a wireless communication signal when the subsystem 410 is positioned near the subsystem 405. When the data is copied to the subsystem 410, the subsystem 405 may re-enter the sleep state.

When a user who is viewing the video program on the television screen (connected to the TiVo subsystem) needs to move to a different location, the user may detach the subsystem 410 from the computer system 500. Because the subsystem 410 has a copy of the video program, the user may continue to view the video program on the display associated with the subsystem 410.

There may be some synchronizing process that enables the subsystem 410 to continue the video program at the appropriate position. For one embodiment, the synchronizing process may include the subsystem 405 sending synchronizing information associated with the data being processed to the subsystem 410. For example, the subsystem 405 may send packet identification number (PID), time stamp, or chronological information to the subsystem 410 to enable the subsystem 410 to synchronize with the data stored in its local memory and to pickup the processing of the data at the appropriate position. This may enable the user to continue to watch the video program using the subsystem 410. As described above, some audio and/or video effects may be used to help with the transition.

When the subsystem 410 is re-coupled to the subsystem 405, the subsystem 410 may also send synchronizing information to the subsystem 405. For example, the subsystem 405 may request the subsystem 410 to send the synchronizing information. This may enable the subsystem 405 to take over the processing of the data when the subsystem 405 exits the sleep state. For one embodiment, the synchronizing information may be exchanged between the subsystem 405 and the subsystem 410 when the lid closed signal 307 and the wake signal 312 (as illustrated in FIG. 3A) are sent.

It may be possible that the subsystem 405 enters the sleep state after the subsystem 410 is detached. Alternatively, the subsystem 405 may remain in its "normal on" state and may continue to play the video program independent of the subsystem 410, as illustrated in FIG. 6. It may be possible that the subsystem 405 may proceed to play a different video or audio program from the program being played by the subsystem 410.

Computer Readable Media

In some embodiments, it is also to be understood that they may be implemented as one or more software programs stored within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system, comprising:
   a first base subsystem, the first base subsystem comprising a first power source, a first display, a first storage device and a first output device, wherein the first base subsystem is configured to execute a first application using data in the first storage device; and
   a second detachable subsystem coupled to the first base subsystem and is configured to execute a second application, the second detachable subsystem being able to access the first storage device and the first output device, wherein a second display and a second storage device storing at least a subset of the data in the first storage device are to reside in the second detachable subsystem, and wherein when the first base subsystem is to enter a sleep state while executing the first application, the second detachable subsystem is configured to continue operations of the first application by executing the second application using the data from the second storage device in the second detachable subsystem each time the second detachable subsystem processes the data.

2. The system of claim 1, wherein the first application and the second application are configured to perform similar operations.

3. The system of claim 2, wherein the first subsystem is to execute the first application using the first display and the first output device, and wherein the second subsystem is to execute the second application using the second display and the first output device when the second subsystem is coupled to the first subsystem.

4. The system of claim 3, wherein the first output device is an audio device.

5. The system of claim 3, wherein the first subsystem is configured to generate a first signal and the second subsystem is configured to receive the first signal wherein the first signal indicates that the first subsystem is to enter the sleep state.

6. The system of claim 5, wherein the first subsystem is configured to send synchronizing information to the second subsystem.

7. The system of claim 6, wherein the second subsystem is configured to execute the second application using the synchronizing information.

8. The system of claim 7, wherein when the second subsystem is to access the data in the first storage device, a second signal is to be generated by the second subsystem and received by the first subsystem to indicate that the first subsystem is to exit the sleep state.

9. The system of claim 8, wherein after the second subsystem completes accessing the data in the first storage device, the first subsystem is to return to the sleep state.

10. The system of claim 9, wherein the first application and the second application are audio player applications.

11. The system of claim 3, wherein the second subsystem comprises a second output device, and wherein the second subsystem is to execute the second application using the second output device when then second subsystem is de-coupled from the first subsystem.

12. The system of claim 11, wherein the second subsystem comprises a second power source, and wherein the second power source is to provide power when the second subsystem is de-coupled from the first subsystem.

13. A system, comprising:
    a first base subsystem configured to execute a first multimedia application using data stored in a first storage device associated with the first base subsystem;
    a second detachable subsystem coupled to the first base subsystem and capable of being de-coupled from the first base subsystem, the second detachable subsystem configured to execute a second multimedia application using data from a second storage device residing in the second detachable subsystem each time the second detachable subsystem processes the data, wherein the data to be stored in the second storage device is at least a subset of the data stored in the first storage device; and
    logic to transition execution of the first multimedia application to execution of the second multimedia application when the first subsystem is to enter a sleep state.

14. The system of claim 13, wherein the logic to transition the execution of the first multimedia application comprises logic to signal to the second subsystem that the first subsystem is to enter the sleep state and logic to send synchronizing information from the first subsystem to the second subsystem.

15. The system of claim 14, further comprising: logic to enable the second subsystem to execute the second multimedia application using a multimedia decoder or playback device associated with the second subsystem.

16. The system of claim 15, further comprising logic to enable the second subsystem to access the data stored in the first storage device.

17. The system of claim 16, wherein the logic to enable the second subsystem to access the data stored in the first storage device comprises logic to wake up the first subsystem.

18. A method, comprising:
    from a first base subsystem, sending synchronizing information to a second detachable subsystem, the synchronizing information associated with data stored in the first subsystem and in the second subsystem, the synchronizing information sent when the first base subsystem is to enter a sleep state; and
    from the second detachable subsystem, using the synchronizing information to process the data stored in a second storage device residing in the second detachable subsystem each time the second detachable subsystem processes the data, wherein the data stored in the second detachable subsystem is at least a subset of the data stored in the first base subsystem, and wherein the first base subsystem and the second detachable subsystems are configured to execute one or more similar applications.

19. The method of claim 18, further comprising: from the second subsystem, sending a signal to the first subsystem to wakeup the first subsystem when the second subsystem needs to access data stored in the first subsystem.

20. The method of claim 19, wherein the second subsystem is to process the data stored in the second subsystem using at least one output device associated with the first subsystem when coupled to the first subsystem.

21. The method of claim 20, wherein the second subsystem is to process the data stored in the second subsystem using its own output device when de-coupled from the first subsystem.

* * * * *

UNITED STATES PATENT AND TRADEMARK OFFICE
CERTIFICATE OF CORRECTION

PATENT NO. : 8,738,951 B2
APPLICATION NO. : 12/380736
DATED : May 27, 2014
INVENTOR(S) : Hong W. Wong et al.

Page 1 of 1

It is certified that error appears in the above-identified patent and that said Letters Patent is hereby corrected as shown below:

In the Claims

In column 9, line 13, in claim 1, delete "and is" and insert -- and --, therefor.

Signed and Sealed this
Twenty-sixth Day of August, 2014

Michelle K. Lee
*Deputy Director of the United States Patent and Trademark Office*